United States Patent
Ha et al.

(10) Patent No.: US 9,558,653 B2
(45) Date of Patent: Jan. 31, 2017

(54) HOME APPLIANCE AND METHOD OF CONTROLLING THE SAME

(71) Applicant: LG ELECTRONICS INC., Seoul (KR)

(72) Inventors: Mikyung Ha, Seoul (KR); Jinho Jeon, Seoul (KR); Bokyung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 147 days.

(21) Appl. No.: 14/248,289

(22) Filed: Apr. 8, 2014

(65) Prior Publication Data

US 2014/0300447 A1    Oct. 9, 2014

(30) Foreign Application Priority Data

Apr. 9, 2013    (KR) .................. 10-2013-0038784

(51) Int. Cl.
    G08C 17/02    (2006.01)
    H04Q 9/00     (2006.01)

(52) U.S. Cl.
    CPC ................ *G08C 17/02* (2013.01); *H04Q 9/00* (2013.01)

(58) Field of Classification Search
    CPC .................................. G08C 17/02; H04Q 9/00
    See application file for complete search history.

(56) References Cited

U.S. PATENT DOCUMENTS

| 5,745,049 | A   | 4/1998  | Akiyama et al. ....... 340/870.17 |
| 7,155,305 | B2  | 12/2006 | Hayes et al. |
| 7,363,031 | B1  | 4/2008  | Aisa |
| 2001/0055954 | A1* | 12/2001 | Cheng .................. H04M 1/725 455/74.1 |
| 2004/0070491 | A1* | 4/2004  | Huang ................... G08C 17/02 340/10.5 |
| 2005/0024255 | A1* | 2/2005  | Chuey .................... G08C 17/02 341/176 |
| 2005/0159823 | A1* | 7/2005  | Hayes .................... G05B 15/02 700/19 |
| 2008/0048837 | A1  | 2/2008  | Montgomery et al. .... 340/10.51 |
| 2008/0122585 | A1* | 5/2008  | Castaldo ................. G06F 9/54 340/286.01 |

(Continued)

FOREIGN PATENT DOCUMENTS

| CN | 102388574 | 3/2012 |
| CN | 102498691 | 6/2012 |

(Continued)

OTHER PUBLICATIONS

European Search Report dated May 8, 2014 issued in Application No. 14163900.5.

(Continued)

*Primary Examiner* — Sisay Yacob
(74) *Attorney, Agent, or Firm* — KED & Associates, LLP

(57) ABSTRACT

A home appliance and a method of controlling the same are provided. The home appliance may include a controller that processes state data. The state data may include raw data representing an operation state of the home appliance. The controller may also output diagnosis result data representing whether or not an error has occurred in the home appliance. A tag device including a tag storage device may store the state data and the diagnosis result data, and a transmitting and receiving device may transmit the state data and the diagnosis result data when an external device is tagged.

20 Claims, 15 Drawing Sheets

(56) References Cited

U.S. PATENT DOCUMENTS

| | | |
|---|---|---|
| 2010/0259404 A1 | 10/2010 | Cho et al. |
| 2011/0032072 A1 | 2/2011 | Han et al. |
| 2013/0060359 A1 | 3/2013 | Kim et al. |
| 2013/0107131 A1* | 5/2013 | Barnett .................. G08C 17/02 348/734 |
| 2013/0249679 A1* | 9/2013 | Arling .................... G08C 19/00 340/12.22 |

FOREIGN PATENT DOCUMENTS

| | | |
|---|---|---|
| CN | 102912589 | 2/2013 |
| CN | 102915004 | 2/2013 |
| JP | 2003-511944 | 3/2003 |

OTHER PUBLICATIONS

Australian Examination Report dated Dec. 10, 2014 issued in Application No. 2014201963.
Chinese Office Action dated May 4, 2016 issued in Application No. 201410140403.6 (with English Translation).

\* cited by examiner

HOME APPLIANCE AND METHOD OF CONTROLLING THE SAME

CROSS-REFERENCE TO RELATED APPLICATION(S)

This application claims priority under 35 U.S.C. §119 to Korean Application No. 10-2013-0038784 filed on in Korea on Apr. 9, 2013, whose entire disclosure is hereby incorporated by reference.

BACKGROUND

1. Field

This relates to a home appliance and a method of controlling the same.

2. Background

Laundry processing devices may include a washing machine, a dryer, and a washing machine having a dryer function. A washing machine may perform washing, rinsing, and dehydration cycles to remove pollutants from laundry items using water, detergent and a mechanical operation. Washing machines may be classified into a top load type washing machine having a drum rotating about a vertical axis, and a front load type washing machine having a drum rotating about a horizontal axis. A dryer may dry laundry items by applying warm air to laundry items received in the drum. A washing machine having a dryer function may perform both a washing function and a drying function.

BRIEF DESCRIPTION OF THE DRAWINGS

The embodiments will be described in detail with reference to the following drawings in which like reference numerals refer to like elements wherein.

DETAILED DESCRIPTION

Figure 1:
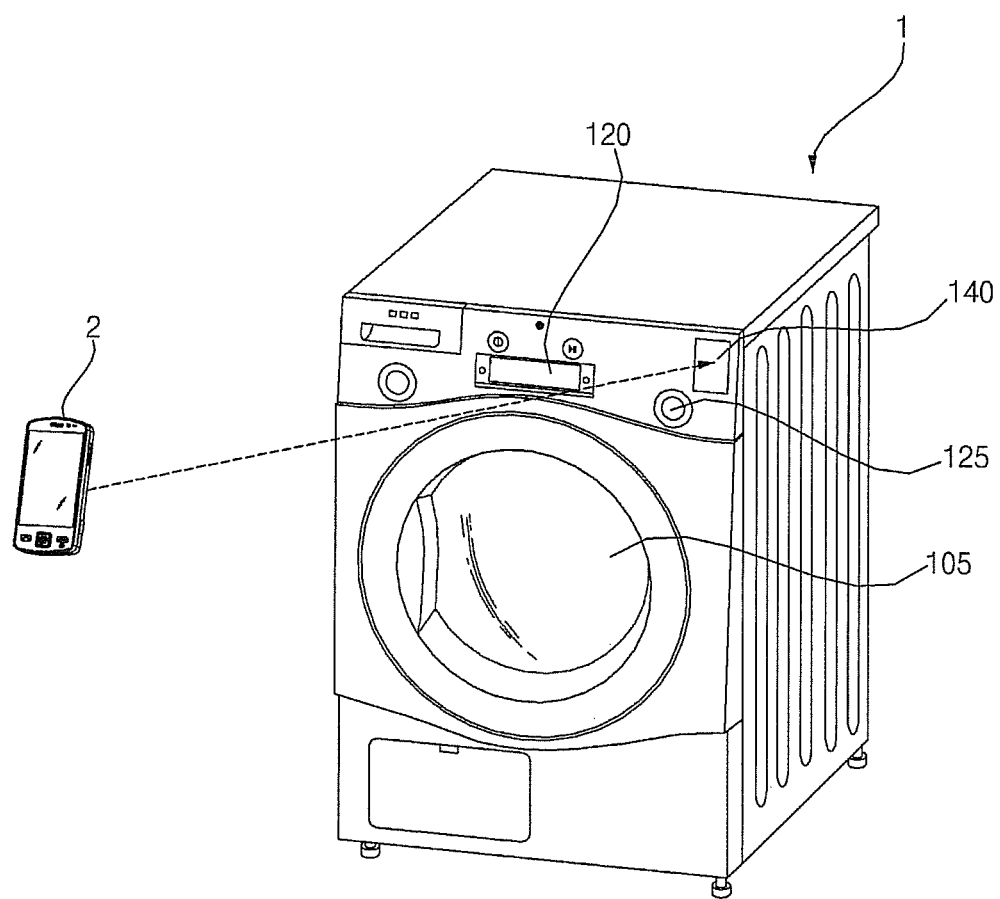
FIG. 1 is a perspective view of a home appliance and a diagnosis system, according to an exemplary embodiment.

These and other objects will become more readily apparent from the detailed description provided hereinafter. However, it should be understood that the detailed description and specific examples, while indicating various exemplary embodiments, are provided by way of illustration only, since various changes and modifications within the spirit and scope as broadly described herein may be apparent to those skilled in the art. Wherever possible, like reference numerals will be used to designate like elements.

Hereinafter, various exemplary embodiments will be described in detail with reference to the accompanying drawings. When describing such exemplary embodiments, a washing machine is presented as an exemplary home appliance, simply for ease of discussion. However, home appliances to which the principles presented herein may be applied are not limited to a washing machine, and may be applied to, for example, a washing machine having a steam spray function, other laundry processing devices such as a washing machine having a drying function, or a dryer, or other such home appliances within the spirit and scope as broadly described herein.

Referring to FIG. 1, a home appliance diagnosis system, or diagnostic system, according to an embodiment as broadly described herein may include, for example, a washing machine 1, provided as an exemplary home appliance product, for purposes of discussion herein, including a tag device 140 that stores state data, which may include raw data indicative of an operation state and diagnosis result data, or diagnostic data, indicating whether an error has occurred during a particular operation state by processing the state data, and a mobile device 2 including a communication device that receives state data and diagnosis result data and a display that displays data received by the communication device through tagging with the tag device 140.

In a washing machine 1 including this type of tag device 140, when a tag storage device that stores state data and diagnosis result data and an external device are tagged, the tag device 140 may include a transmitting and receiving device that transmits the state data and the diagnosis result data.

The washing machine 1 may include a detection device that detects an operation state. The washing machine 1 may store various data based on an operation state detected by the detection device at the tag storage device. When at least one predetermined event occurs, the washing machine 1 may update state data and diagnosis result data stored in the tag storage device.

The mobile device 2 may communicate with the washing machine 1 through, for example, the tag device 140. When the tag device 140 of the washing machine 1 is tagged, the mobile device 2 may include a communication device that may perform data communication.

The mobile device 2 may include a display that visually displays data received from the washing machine 1. The mobile device 2 may process data received from the washing machine 1 and display various information in response to a user request for information.

Figure 2:
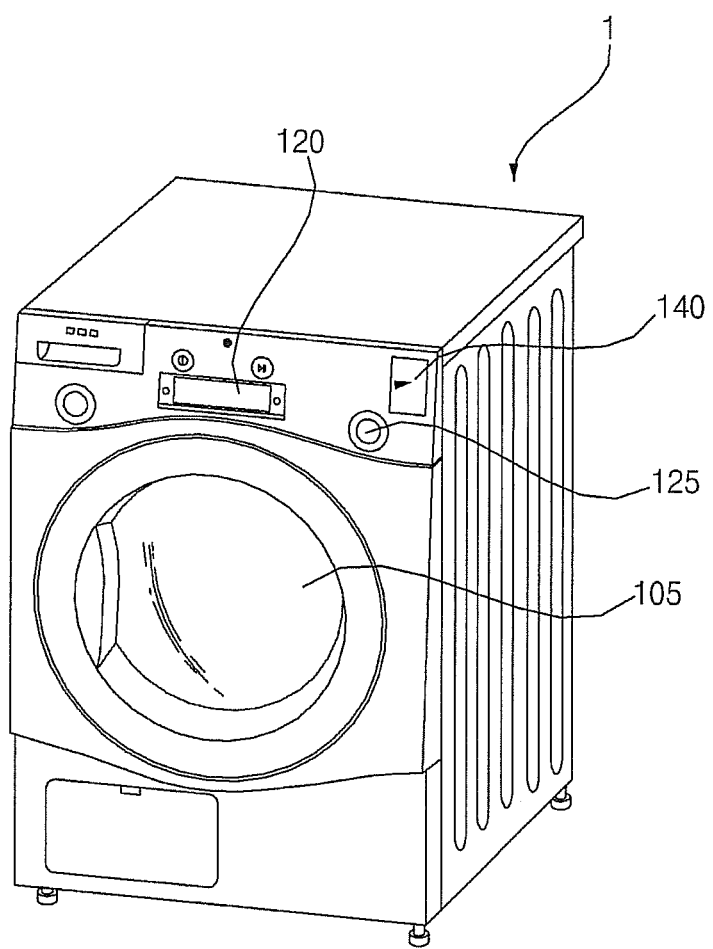
FIG. 2 is a perspective view of a washing machine, according to an exemplary embodiment.

Referring to FIG. 2, the washing machine 1 may include a case that defines an exterior and a drum rotatably provided within the case to receive laundry items therein. One or more lifts may be provided at an inner circumferential surface of the drum, so that when the drum rotates, the lift(s) may move the laundry items upward and downward.

The case may have a laundry injection port to introduce laundry into the drum at, for example, a front side thereof. At an upper portion of a front surface of the case, a display device 120, which may be one of a number output devices that display various information, may be disposed. The display device 120 may include a light source such as, for example, a Liquid Crystal Display (LCD), a Light Emitting Diode (LED) and the like that display control information of the washing machine, but the display device 120 is not limited thereto.

A door 105 may be rotatably coupled to the case at the laundry injection port to open and close the laundry injection port. The door 105 may be manually manipulated by a user or may be operated by an electronic control.

At least one button 125 may be provided at the front side of the case. As shown in FIG. 2, the button 125 may be a mechanical button manipulated by a user's touch, but the button 125 is not limited thereto, and the button 125, for example, may include a touchpad configured to recognize a touch input. The button 125 may correspond to one or more control instructions that operate the washing machine.

Figure 3:
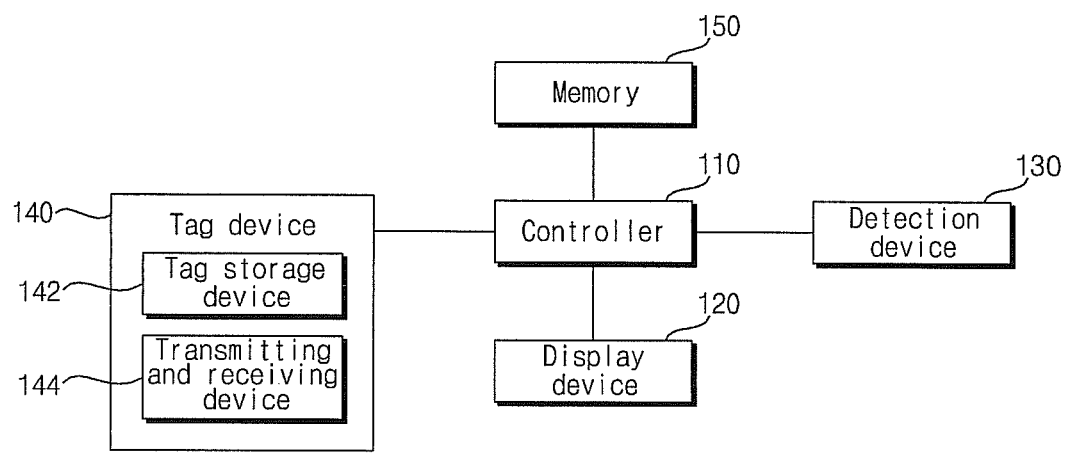
FIG. 3 is a block diagram of a washing machine, according to an exemplary embodiment.

Referring to FIG. 3, the home appliance may include a detection device 130 that detects various states of the washing machine 1, a controller 110 that receives state data, including raw data detected by the detection device 130, and that processes state data and outputs diagnosis result data indicating whether an error has occurred in a particular operation state, and a tag device 140 including a tag storage device 142 that stores state data and diagnosis result data and a transmitting and receiving device 144 that transmits state data and diagnosis result data when an external device is tagged. The home appliance according to an exemplary embodiment may be, for example, a washing machine.

The controller 110 may control operation of the home appliance. The controller 110 may transmit and receive a control signal to and from various elements of the home appliance. The controller 110 may transmit a signal to other elements of the home appliance to control the other elements. In order to process data, the controller 110 may control the display device 120 to display data stored in a memory 150 or may perform a program stored in the memory 150.

The controller 110 may store state data, for example raw data including various states of the washing machine 1 detected by the detection device 130 in the memory 150 or the tag storage device 142. The controller 110 may process state data and output diagnosis result data. The diagnosis result data may be information on whether an error has occurred during a particular operation state based on state data.

The controller 110 may obtain diagnosis result data indicating whether an error has occurred in a particular operation state based on state data. The controller 110 may control diagnosis result data to include information on whether an error has occurred, related to at least one predetermined item considered to be important in operation of the home appliance. The diagnosis result data may be obtained from the state data.

For example, when a predetermined event occurs, the detection device 130 may detect an operation state of the washing machine 1. The predetermined event may include at least one of when the detection device 130 newly detects an operation state, when an error occurs, when power is turned off, when a plug is unplugged, and other such events.

The controller 110 may store state data or diagnosis result data of a state of the washing machine 1 at a plurality of points in time corresponding to events in the memory 150 or the tag storage device 142. The controller 110 may store state data or diagnosis result data corresponding to a recent state at a plurality of points in time in the memory 150 or the tag storage device 142.

The memory 150 may include a high speed random access memory (RAM). The memory 150 may include a non-volatile memory such as at least one magnetic disk storage device, a flash memory device, or other non-volatile solid phase memory devices, but the memory 150 is not limited thereto and may include a readable storage medium.

For example, the memory 150 may include an Electronically Erasable and Programmable Read Only Memory (EEP-ROM), but the memory 150 is not limited thereto. The EEP-ROM may write and erase information by the controller 110. Even if power is turned off and power supply is stopped, the EEP-ROM may be a storage device that does not erase but maintains information stored therein.

The memory 150 may store various programs or data through coordination and communication with the controller 110. A program stored in the memory 150 may be executed by the controller 110. The memory 150 may store state data and diagnosis result data. When at least one predetermined event occurs, the controller 110 may update operation state data and diagnosis result data stored in the memory 150. Even when a supply of power to the home appliance is interrupted, the memory 150 may maintain state data and diagnosis result data. The at least one event may include at least one of when the detection device 130 newly detects an operation state of the washing machine 1, when an error occurs, when power is turned off, when a plug is unplugged, and other events as appropriate.

The washing machine 1 may perform a plurality of washing operations. For example, the washing machine 1 may perform a washing operation such as, for example, a wool washing cycle, general washing cycle, dehydration cycle, or drying cycle, but washing operations are not limited thereto.

The display device 120 may display various information related to the washing machine 1. Output devices of the washing machine 1 may include the display 120 that visually displays information related to the washing machine 1, a speaker that audibly outputs information, and other such devices, such that the output device may include various other output devices not limited thereto.

The tag device 140 may communicate with an external device. The tag device 140 may include the tag storage device 142 that stores data and a transmitting and receiving device 144 that communicates externally. The tag device 140 may perform Near Field Communication (NFC) with an appropriate external device capable of NFC.

The tag device 140 may store model information of the washing machine 1. The model information may include a production company and a model name of the washing machine and information on whether the washing machine is capable of communication.

NFC may operate using a simple recognition/tag/data exchange operation. In NFC, data may be processed and transmitted and received using a desired method. In NFC, compatibility between various devices may be established, and when terminals including an NFC module follow a particular data specification, data may be synchronized therebetween.

In NFC, communication may be performed within a specified communication distance, for example, less than 10 cm. In NFC, because a communication distance is relatively short, risk of exposure of personal information may be reduced. When an NFC function is activated, the tag device 140 may read or write data through a tagged device.

The tag storage device 142 may receive state data and diagnosis result data from the controller 110. When at least one predetermined event occurs, the controller 110 may update state data and diagnosis result data stored at the tag storage device 142.

The at least one event may include at least one of when the detection device 130 newly detects an operation state of the washing machine 1, when an error occurs, when power is turned off, when a plug is unplugged, and other such events. The tag storage device 142 may store state data and diagnosis result data, and even when a supply of power to the home appliance is interrupted, the tag storage device 142 may maintain storage of the data.

The detection device 130 may include, for example, a plurality of sensors that detect various states of the washing machine. For example, the detection device 130 may detect an operation course being currently performed by the washing machine, a water temperature, a dehydration strength, a number of operating times, an elapsed/remaining amount of operation time, or an operation state. For example, the detection device 130 may include a plurality of sensors such as a thermometer that detects a temperature of water, a sensor that detects a rotation speed of a drum, and a sensor that detects the number of operating times of the drum, but a type of detection device 130 is not limited thereto.

Figure 4:
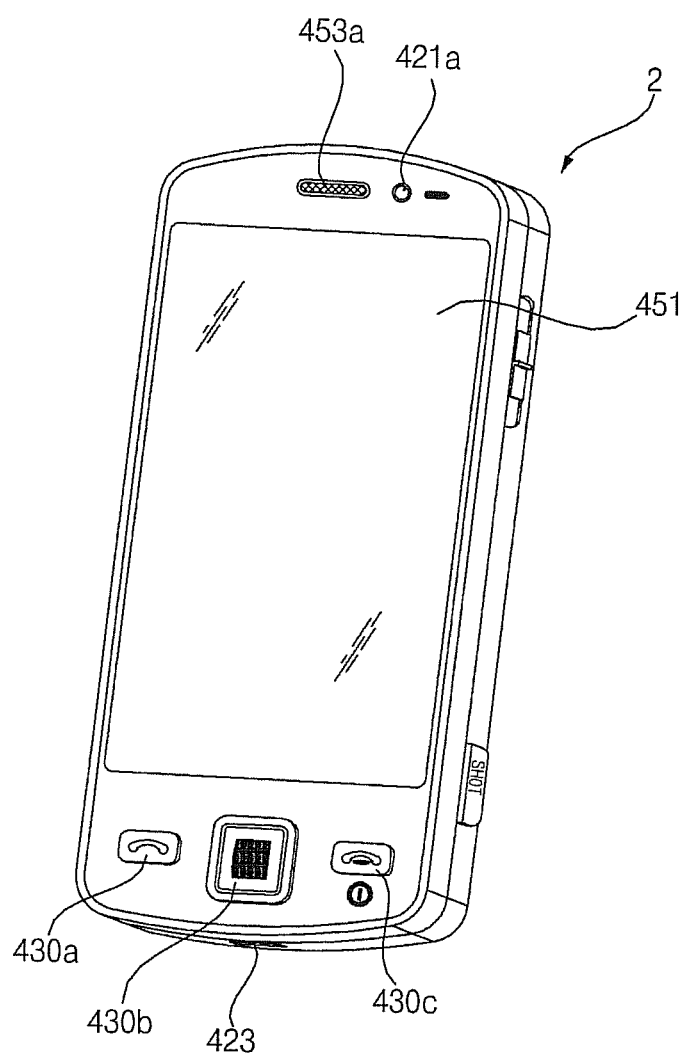
FIG. 4 is a perspective view of a mobile device of a home appliance diagnosis system, according to an exemplary embodiment.

FIG. 4 is a perspective view of a mobile device which may be operated as part of a home appliance diagnosis system, according to an exemplary embodiment as broadly described herein.

Hereinafter, for convenience of description, although mobile terminals may include several types such as a folder type, a bar type, a swing type, a slider type, and other such terminals, a bar type mobile terminal having a front surface touch screen is exemplified. However, embodiments are not limited to a bar type mobile terminal and may be applied to various other types of mobile terminals.

Referring to FIG. 4, the mobile device may include a communication device that receives state data and diagnosis result data, or diagnostic data, by tagging with the tag device of the washing machine and a display 451 that displays data received by the communication device. As touch pads may have an overlapped layer structure, the display 451 may operate as a touch screen and receive information input by a user's touch.

An audio output device 453*a* in the form of a receiver or a speaker may output audio information. A camera 421*a* may capture a still image or a moving picture. A microphone 423 may receive an audio input such as a user's voice and other sounds.

The mobile device may include at least one input device 430. For example, the mobile device may include first, second and third input devices 430*a*, 430*b*, and 430*c* capable of receiving an instruction such as communication, mouse point movement, screen scrolling, start, and end.

Figure 5:
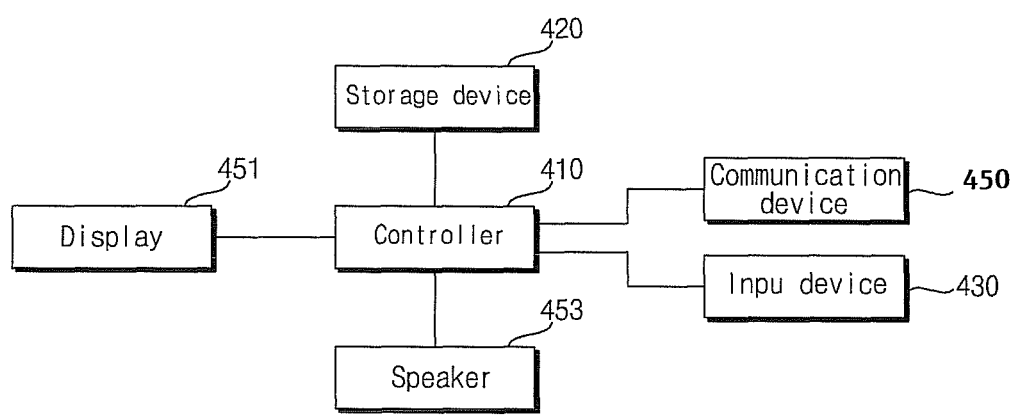
FIG. 5 is a block diagram of a mobile device of a home appliance diagnosis system, according to an exemplary embodiment.

FIG. 5 is a block diagram of a mobile device of a home appliance diagnosis system, according to an exemplary embodiment. Referring to FIG. 5, the mobile device may include a controller 410 that controls operation of the mobile device, a storage device 420 that stores various programs or data, a communication device 450 that receives state data and diagnosis result data, and a display 415 that displays data received by the communication device 450.

The controller 410 may control operation of the mobile device. In order to process data, the controller 410 may control the display 451 to display data stored in the storage device 420 or may perform a program stored in the storage device 420.

The controller 410 may store state data and diagnosis result data received by the communication device 450 in the storage device 420. The controller 410 may control the display 451 to display state data and diagnosis result data received by the communication device 450.

The controller 410 may control the display 451 to display information indicating whether an error has occurred in the operation of the washing machine 1. The controller 410 may control the display 451 to display diagnosis result data. The controller 410 may determine whether diagnosis result data includes a request for information from the user.

For example, the diagnosis result data may include an indication of whether an error has occurred in connection with at least one predetermined important item, and the controller 410 may determine whether information requested by the user corresponds to a diagnosis result value included in the diagnosis result data.

If information requested by the user does not correspond to a diagnosis result value included in the diagnosis result data, the controller 410 may control the display 451 to display state data. For example, the state data may be raw data representing an operation state of the washing machine, and when information requested by the user is not included in the diagnosis result data, which is a diagnosis result value of a particular item, the controller 410 may control the display 451 to display state data.

The display 451 may visually display various items of information. For example, the display 451 may include at least one of a liquid crystal display (LCD), a thin film transistor-liquid crystal display (TFT-LCD), an organic light-emitting diode (OLED), a flexible display, a three-dimensional display (3D display), or other type of display as appropriate.

In certain embodiments, at least two displays may be provided with the mobile device. For example, the mobile device may simultaneously have an external display and an internal display.

The display 451 may receive a control signal from the controller 410 and display state data or diagnosis result data.

The speaker 453 may output state data or diagnosis result data with a sound signal. For example, when the input device 430 receives an input that requests data be output with a sound, the controller 410 may output state data or diagnosis result data with a sound signal via the speaker 453.

The communication device 450 may perform NFC. When the communication device 450 is located within a predetermined distance from the tag device of the washing machine, the communication device 450 may perform communication with the tag device. The communication device 450 may receive state data, diagnosis result data, model information and other such information from the tag device.

The controller 410 may determine whether a diagnosis mode that diagnoses the washing machine may be performed based on model information which the communication device 450 receives. For example, the controller 410 may determine a washing machine production company and a washing machine model in supporting a diagnosis mode. The controller 410 may determine whether the washing machine may perform NFC based on model information and whether a diagnosis mode may be performed.

The controller 410 may control the display 451 to display state data or diagnosis result data related to a state of the washing machine at a plurality of points in time corresponding to events that have occurred in the washing machine.

Figure 6A:
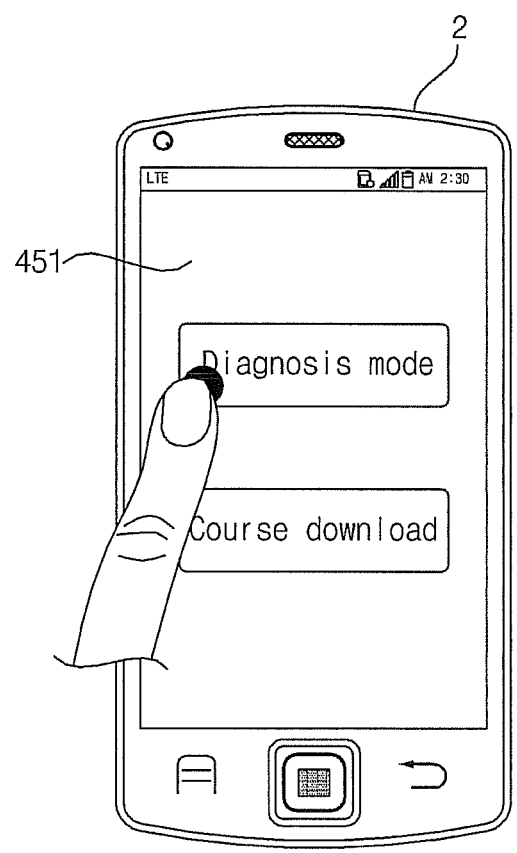
FIGS. 6A to 10 illustrate operation of a home appliance diagnosis system, according to an exemplary embodiment.
Figure 6B:
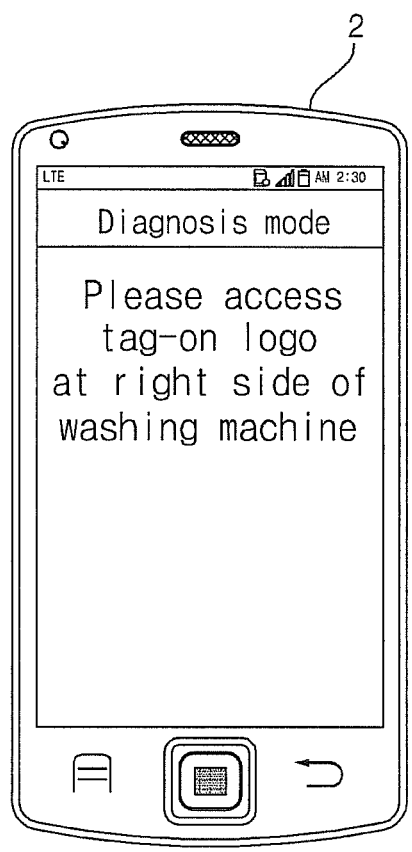

Referring to FIGS. 6A-6B, the mobile device may receive a request for a diagnosis mode through the input device 430. For example, when the display 451 is a touch screen that recognizes a touch input, the input device 430 may be included in the display 451, and FIGS. 6 to 10 illustrate the mobile device 2 including a touch screen.

When a diagnosis mode is selected as shown in FIG. 6A the mobile device 2 may display on the display 451 an instruction to tag the mobile device 2 with the washing machine as shown in FIG. 6B. The user may view the instruction displayed on the display 451 and may determine that the tag device of the washing machine should be tagged.

Figure 7:
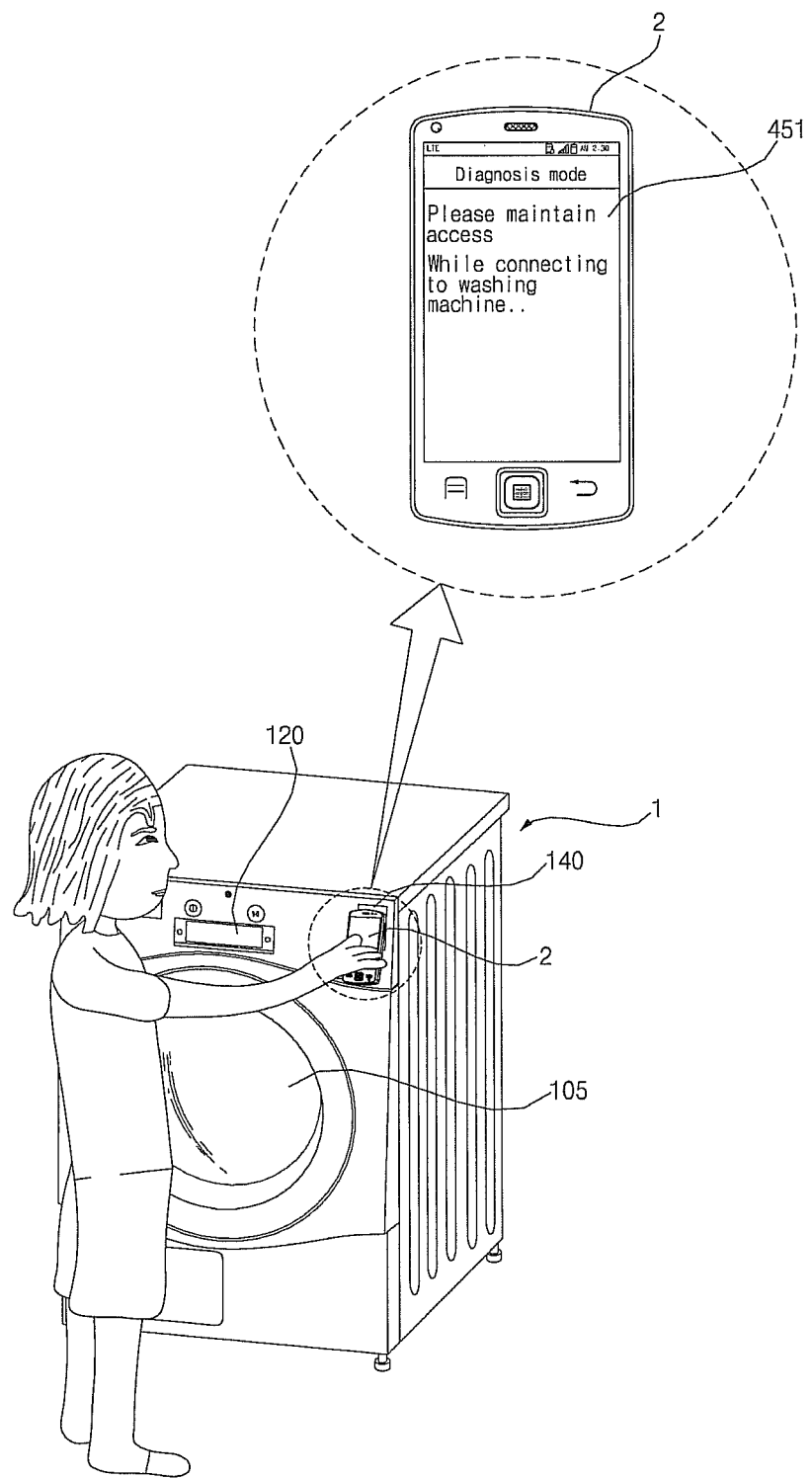

Referring to FIG. 7, when the mobile device and the tag device of the washing machine are located within a predetermined distance, the communication device of the mobile device and the tag device of the washing machine may initiate communication.

The tag device may transmit state data, diagnosis result data, and model information to the communication device of the mobile device. The model information may be included in a header of a packet, but a location of the model information is not limited thereto. The tag device and the communication device of the mobile device may perform communication for a predetermined time. While performing communication, in order to maintain a distance in which tagging is available, the display of the mobile device may display that communication is being performed.

The controller of the mobile device may receive model information and determine whether a diagnosis mode may be performed. When the washing machine is determined to be a product that cannot perform a diagnosis mode from the received model information, the mobile device may display on the display that a diagnosis mode cannot be performed.

While the tag device of the washing machine and the communication device of the mobile device are communicating, the mobile device may continue to display information indicating that tagging should be maintained, as shown in FIG. 7.

Figure 8:
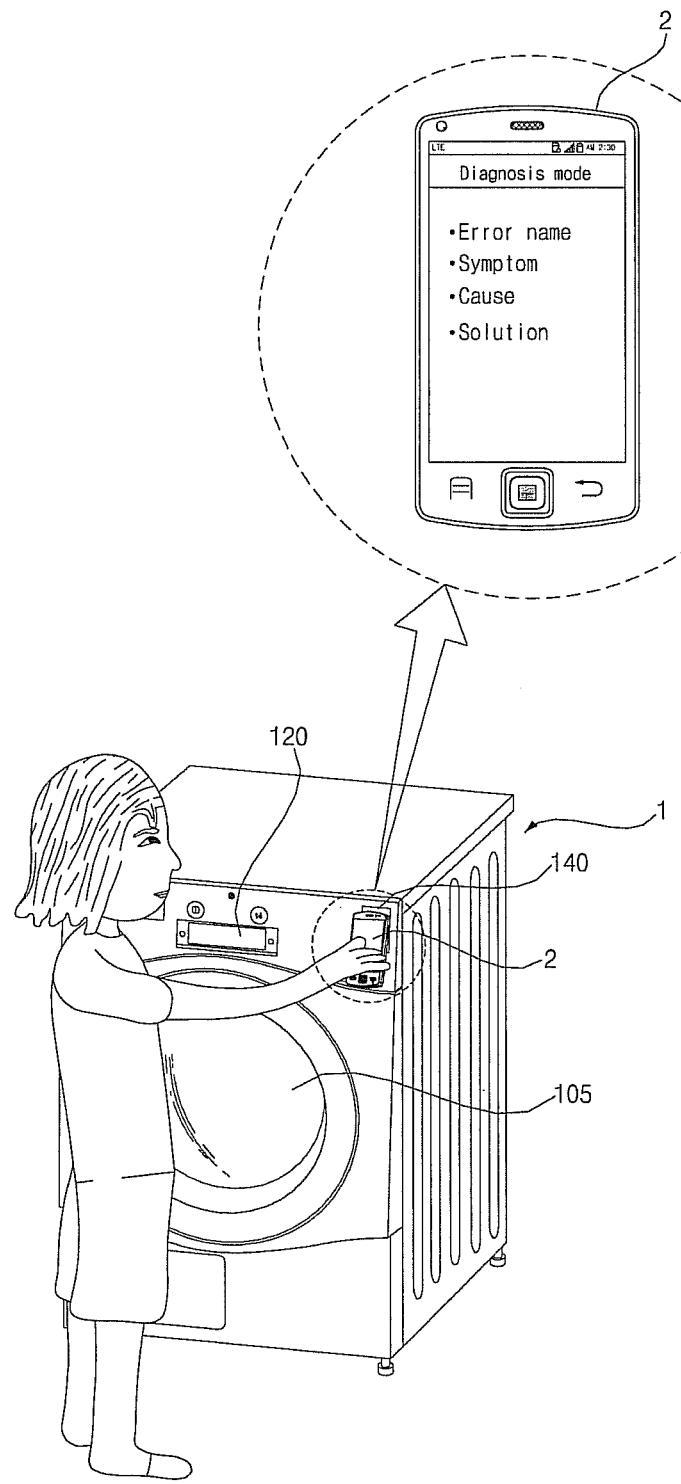

Referring to FIG. 8, when the mobile device determines that a diagnosis mode can be performed based on the model information, the mobile device may display state data or diagnosis result data on the display.

For example, the mobile device may detect a current state of the washing machine based on diagnosis result data presently stored in the tag device of the washing machine. For example, diagnosis result data or state data may include information on whether a problem has occurred in the washing machine based on a recent error content or operation state of the washing machine.

When the display of the mobile device displays diagnosis result data, the display may display at least one of a name of an error that has occurred in the washing machine, a symptom occurring in operation of the washing machine, a cause of an error, and a solution.

Referring to FIG. 9, the controller of the mobile device may detect a request for information from a user and may determine whether the requested information is included in a diagnosis result of the diagnosis result data.

For example, in response to a user request for diagnostic data from the washing machine, the controller may control the display to display state data and, in certain embodiments, to display a meaning of the state data so that the user may easily understand the information.

For example, the state data may include a name of an operation course of the washing machine, a water temperature, a dehydration strength, a number of operating times, operating time elapsed/remaining, or an operation state. The state data may include information such as an operation course in which the washing machine operates or error generation.

Figure 9A:
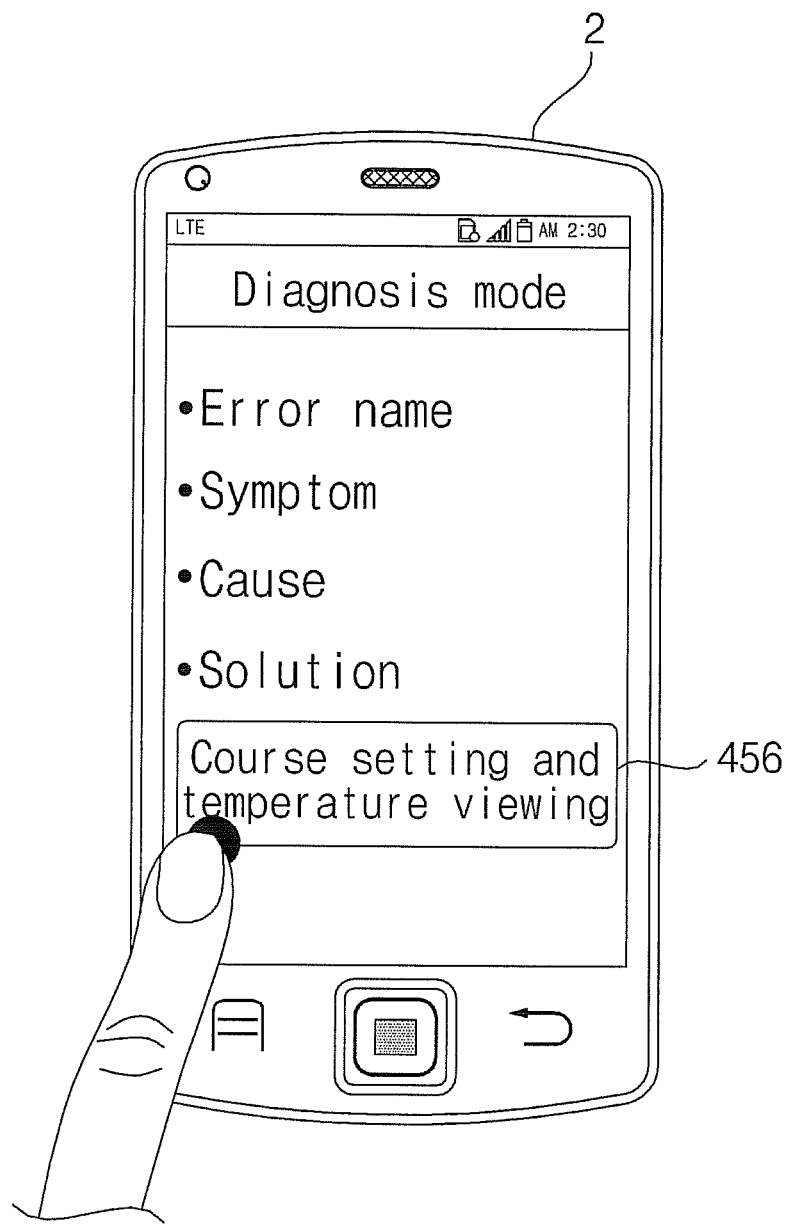
Figure 9B:
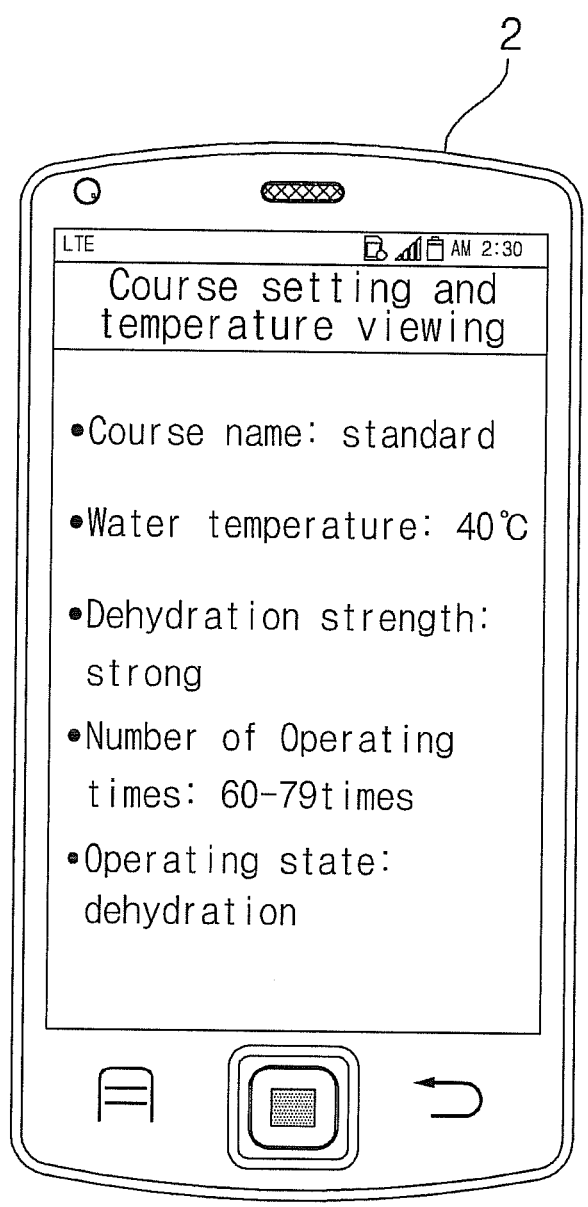

The display 451 of the mobile device 2 may display information in addition to a diagnosis result value including diagnosis result data using, for example, an icon in response to a user request. For example, the display 451 of the mobile device 2 may display an icon 456 corresponding to course setting and temperature, as shown in FIG. 9A. Selection of the icon 456 in FIG. 9A causes the requested information to be displayed as shown in FIG. 9B.

The controller of the mobile device 2 may also display an icon in which the user may input particular request information, and when the icon is selected, the controller may control the display to display appropriate state data.

Figure 10:
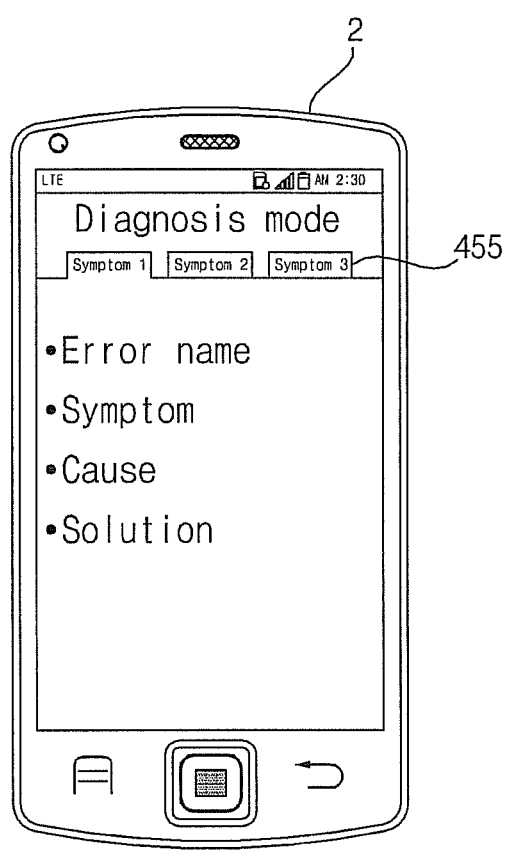

Referring to FIG. 10, the mobile device 2 may display a plurality of state data and diagnosis result data. For example, a plurality of tabs and a plurality of state data and diagnosis result data corresponding to each of the plurality of tabs may be displayed. Each state data and diagnosis result data may correspond to a detection result detected at a plurality of points in time. The detection result detected at the plurality of points in time may each correspond to a result detected at a point in time at which a predetermined event occurs.

The state data and the diagnosis result data may be data related to general operation of a home appliance, or may represent data detected when an error occurs, but the state data and the diagnosis result data is not limited thereto.

Figure 11:
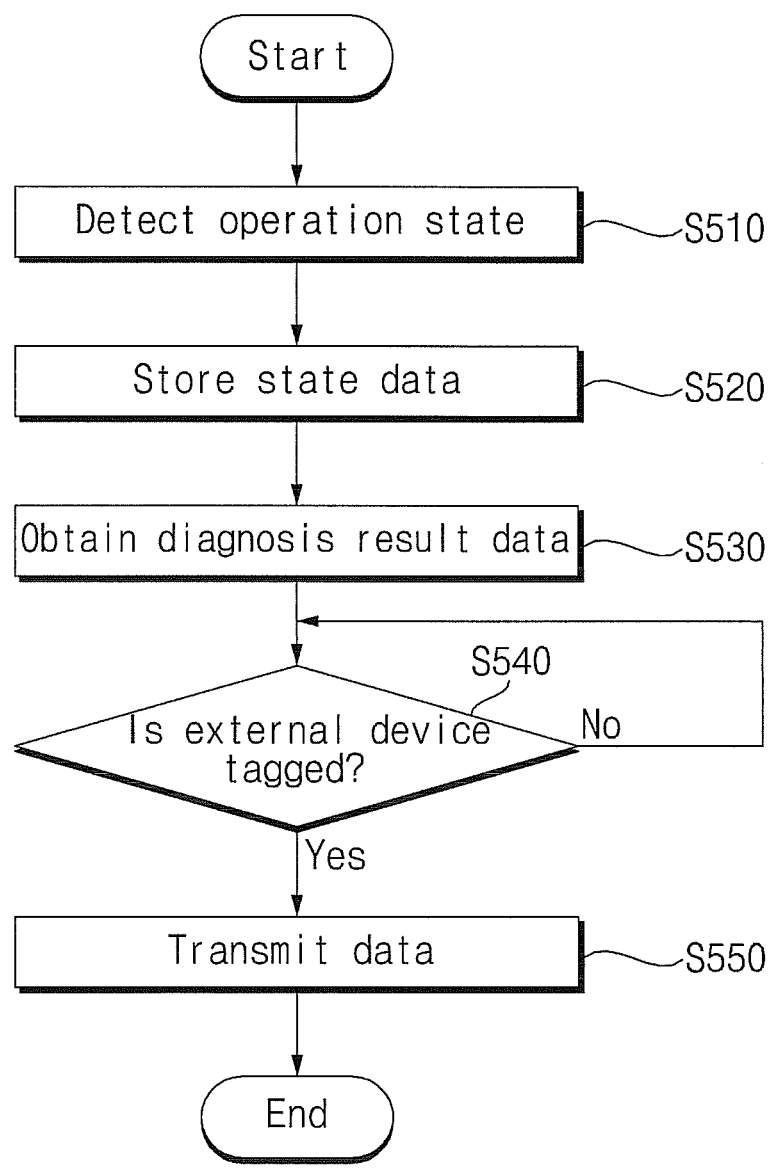
FIG. 11 is a flowchart of a method of controlling a home appliance, according to an exemplary embodiment.

FIG. 11 is a flowchart of a method of controlling a home appliance according to an exemplary embodiment as broadly described herein.

Referring to FIG. 11, first, an operation state of the home appliance may be detected (S510). Then, state data, including detected raw data, may be stored (S520), and diagnosis result data may be obtained (S530), representing whether an error has occurred. It is then determined whether an external device is tagged (S540), and the state data and the diagnosis result data may be transmitted to an external device (S550) if it is determined that the external device is tagged. The home appliance of an exemplary embodiment may be a washing machine.

When detecting an operation state of the home appliance (S510), the detection device 130 of the washing machine 1 may detect various states of the washing machine 1. The detection 130 may transmit information about a detected state of the washing machine 1 to the controller 110.

When storing state data (S520), the controller 110, having received state data from the detection device 130, may store the state data in the memory 150 or tag storage device 142 of the tag device 140.

When obtaining diagnosis result data (S530), the controller 110, having received state data from the detection device 130, may obtain diagnosis result data including a diagnosis result value based on the state data. The diagnosis result value may be provided based on one of a plurality of diagnosis items.

The controller 110 may store state data and diagnosis result data in the memory 150 and/or the tag storage device 142. When one of a plurality of predetermined events occurs, the controller 110 may update the state data and diagnosis result data stored in the memory 150 and the tag storage device 142. The diagnosis result data may include information on whether an error has occurred in relation to at least one predetermined item considered to be important in the operation of the appliance.

When detecting whether an external device is tagged (S540), the tag device 140 may continue to determine whether an external device including a communication device 450 that can be tagged is located within a predetermined distance. The external device may be a mobile device, such as the mobile device 2 discussed above, tagged with the tag device 140 of the home appliance to receive state data and diagnosis result data.

When the tag device 140 detects that an external devices including a module that can perform NFC, such as the communication device 450 discussed above, is located within a predetermined distance, the tag device 140 may transmit data to the external device and synchronize data (S550).

A method of controlling a home appliance, as embodied and broadly described herein, may also include storing state data and diagnosis result data at a tag storage device. When at least one predetermined event occurs, the home appliance may update state data and diagnosis result data.

Figure 12:
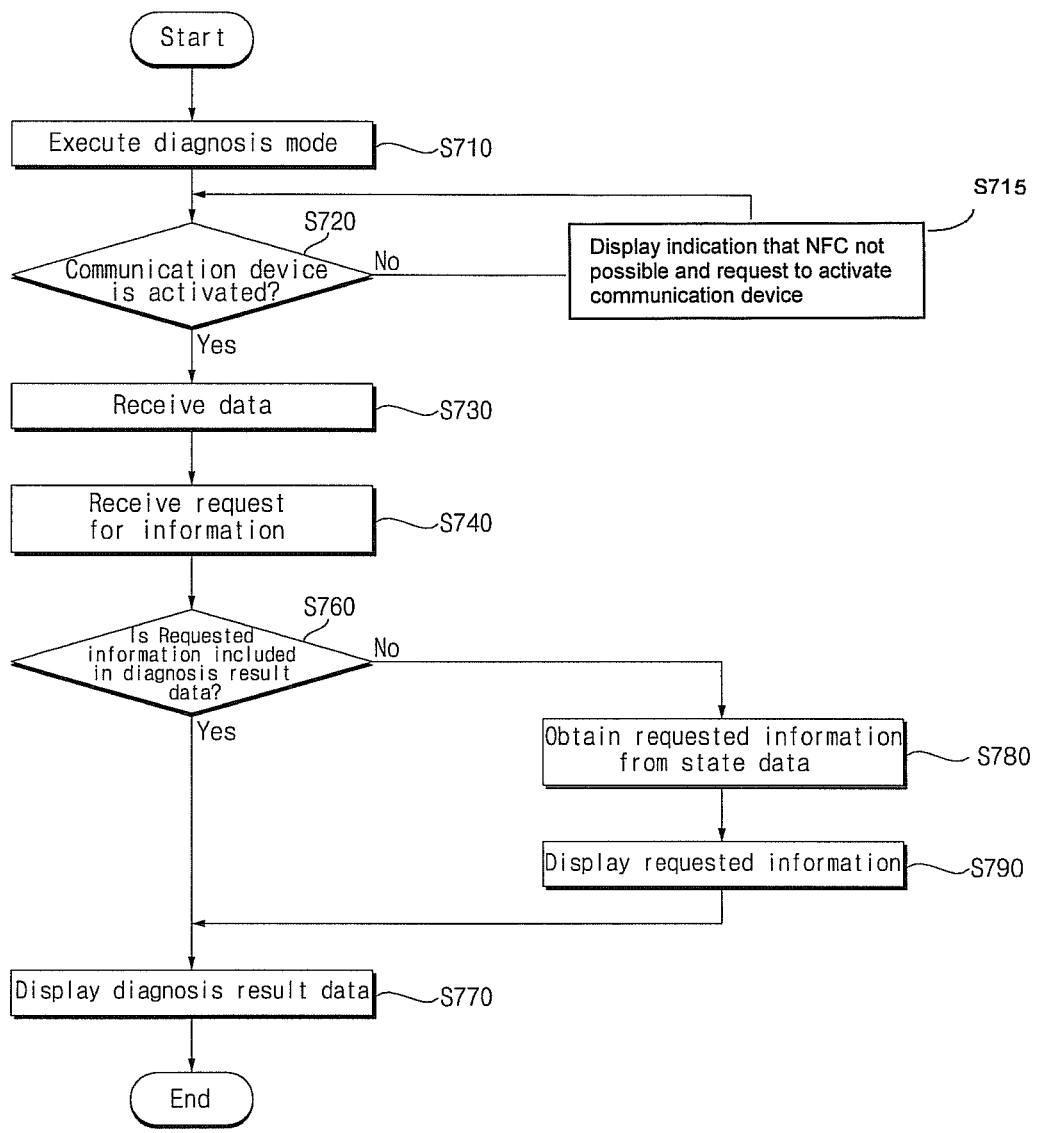
FIG. 12 is a flowchart of a method of controlling a home appliance diagnosis system, according to an exemplary embodiment.

FIG. 12 is a flowchart of a method of controlling a home appliance diagnosis system, according to an exemplary embodiment as broadly described herein.

Referring to FIG. 12, a method of controlling a home appliance diagnosis system as embodied and broadly described herein may include executing a diagnosis mode (S710), determining whether a communication device is activated in order to tag (S720), obtaining state data and diagnosis result data through tagging and receiving diagnosis result data indicating whether an error has occurred in an operation state (S730) and displaying the received state data or diagnosis result data (S770). The home appliance of an exemplary embodiment may be a washing machine.

When executing a diagnosis mode (S710), the mobile device may receive an input instructing that a diagnosis mode be executed or carried out. When the mobile device receives an instruction to execute a diagnosis mode, the mobile device may determine whether a communication device that can tag with a tag device of the appliance is activated (S720). If a communication device is not activated, the mobile device may display that NFC cannot be performed and display a request to activate the communication device (S715). If it is determined that a communication device is activated, the mobile device may display information that instructs to tag.

When receiving state data and diagnosis result data (S730), when the mobile device is located at a constant distance from a tag device of the appliance, the mobile device may perform communication with the tag device. The mobile device may receive state data and diagnosis result data and store the state data and diagnosis result data in a storage device.

In certain embodiments, when receiving state data and diagnosis result data, when the mobile device is located at a constant distance from a tag device, the mobile device may output, for example, a sound or such indication indicating that communication is started/ongoing.

In certain embodiments, when receiving state data and diagnosis result data (S730), the mobile device may display on a display that state data and diagnosis result data is being received/exchanged.

In certain embodiments, when receiving state data and diagnosis result data, the mobile device may receive model information of the washing machine and determine whether a diagnosis mode is capable of being performed based on the received model information. The model information may include at least one of a production company and a model name of the washing machine and information on whether the washing machine is capable of communication.

In certain embodiments, the method may also include receiving an input requesting information (S740) and determining whether a diagnosis result value corresponding to the requested information is included in a plurality of diagnosis result values included in the diagnosis result data (S750).

The mobile device may determine whether information corresponding to the requested information is included in a plurality of diagnosis result values included in the diagnosis result data (S760), and, if so, the mobile device may display the diagnosis result data (S770).

If information corresponding to the requested information is not included in the plurality of diagnosis result values included in the diagnosis result data (S760), the mobile device may display state data. For example, the mobile device may obtain the requested information from state data (S780) and display the requested information on the display (S790).

For example, the requested information may be at least one of a course name, a water temperature, a dehydration strength, a number of operating times, or an operation state. The state data may include the type of request information. For example, the requested information may be a request for state data, and if the requested information is not one of the diagnosis result values in the diagnosis result data, the mobile device may display state data on the display in response to the request.

Figure 13:
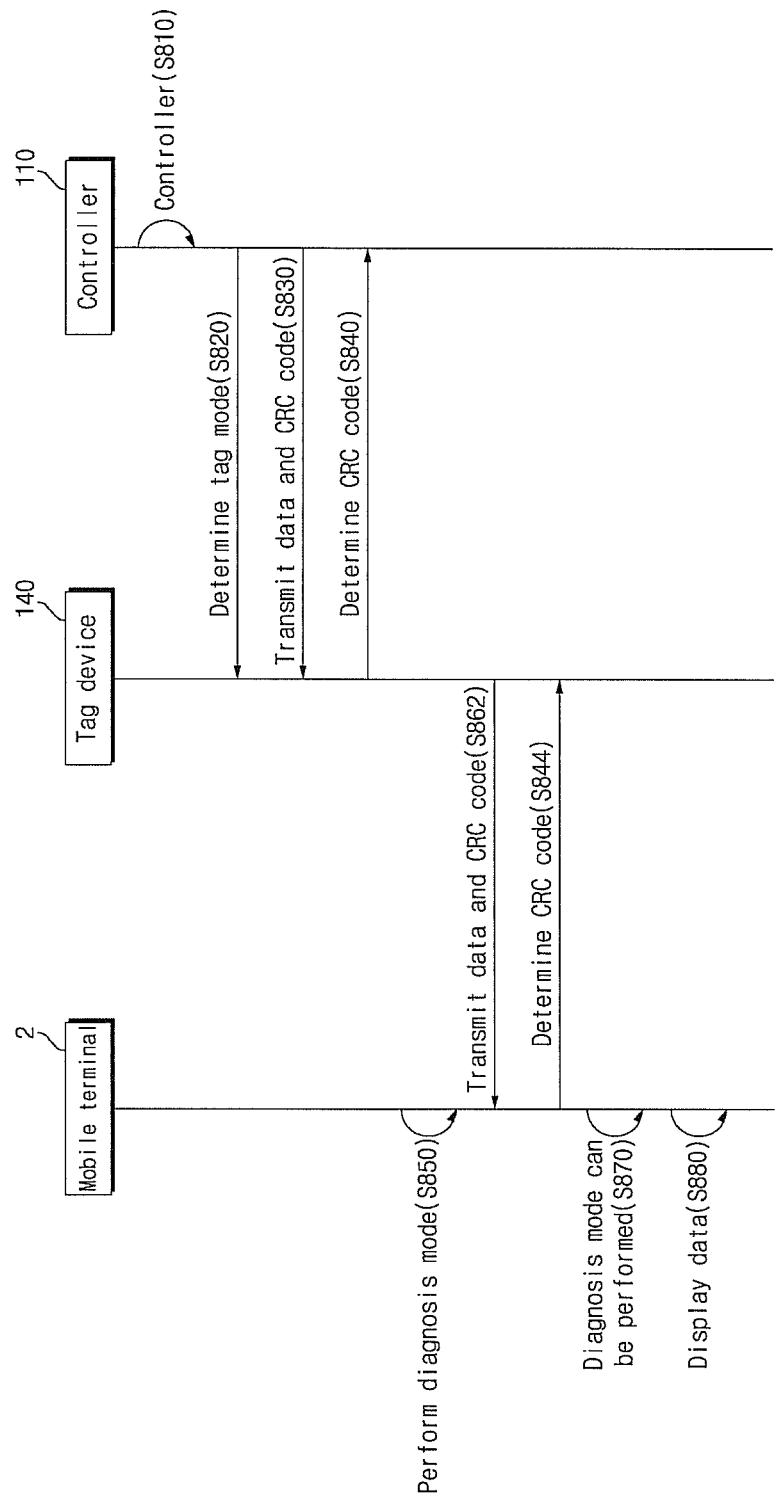
FIG. 13 is a message flow diagram of a communication process of a home appliance diagnosis system, according to an exemplary embodiment.

FIG. 13 is a message flow diagram of a communication process of a home appliance diagnosis system, according to an exemplary embodiment as broadly described herein.

Referring to FIG. 13, the controller 110 of the washing machine 1 may determine a communication relationship between the controller 110 and the tag device 140 of a washing machine, which is provided herein as an exemplary embodiment of a home appliance, and a communication relationship between the tag device 240 and the mobile device 2.

The controller 110 of the washing machine 1 may determine whether an event that would trigger an update to state data and diagnosis result data has occurred (S810). The event may include at least one of when a detection device 130 of the washing machine 1 newly detects an operation state, when an error occurs, when power is turned off, when a plug is unplugged, and other such events.

The controller 110 may determine a tag mode of the tag device 140 (S820). For example, the controller 110 may determine whether the tag device 140 is presently tagged with another external device and is communicating with another external device. If the tag device 140 is not presently communicating with another external device, the controller 110 may transmit state data and diagnosis result data to the tag device (S830).

When the controller 110 transmits data to the tag device 140, the controller 110 may add a CRC code to the data and transmit to the tag device 140. When the tag device 140 receives state data and diagnosis result data from the controller 110, the tag device 140 may determine whether data is appropriately received based on the CRC code (S840).

The tag device 140 may receive model information from the controller 110 and store the model information in the tag storage device 142. When each item of data is transmitted and received, a process of determining whether an error has occurred may be performed, but a method thereof is not limited thereto. In an exemplary embodiment, a washing machine diagnosis system may use a CRC method.

The mobile device 2 may then perform a diagnosis mode (S850). When the mobile device 2 executes the diagnosis mode, the mobile device 2 may display an indication that the mobile device 2 should be tagged with the washing machine.

When the mobile device 2 enters within a predetermined distance from the tag device 140, the tag device 140 may transmit state data, diagnosis result data, and model information to the mobile device 2 (S862). When the mobile device 2 receives the data, the mobile device 2 may determine whether a CRC code is appropriately received (S864).

The mobile device 2 may determine whether a diagnosis mode may be executed based on model information (S870).

If a diagnosis mode may be executed, the mobile device 2 may display state data and diagnosis result data (S880).

Even if all of the constituent elements of an exemplary embodiment are coupled to one another or are operated by coupling, embodiments are not limited to such an exemplary embodiment. All of the constituent elements may be selectively coupled to and operated with at least one constituent element according to an exemplary embodiment as broadly described herein.

All of the constituent elements may be embodied with one independent hardware item, but a portion of or all of the constituent elements may be selectively combined and may be embodied as a computer program having a program module that performs a partial function or an entire function combined in one hardware item or a plurality of hardware items.

A plurality of codes and code segments constituting a computer program may be developed, and such a computer program may be stored in a computer readable medium, be read and executed by a computer, and embody an exemplary embodiment as broadly described herein. A recording medium of a computer program may include a magnetic recording medium, a light recording medium, and a carrier wave medium.

As described above, a home appliance control system, as embodied and broadly described herein, may receive information of a home appliance with a mobile device using NFC and thus a method of using a home appliance may be intuitively provided to a user.

In a home appliance and a method of controlling the same, as embodied and broadly described herein, the home appliance may obtain diagnosis result data and a user may quickly determine a diagnosis result, without a separate calculation, with a mobile device.

In a home appliance and a method of controlling the same, as embodied and broadly described herein, when an event occurs, by updating state data and diagnosis result data, a user may determine most recent information.

In a home appliance and a method of controlling the same, as embodied and broadly described herein, by transmitting state data, which may be raw data, to a mobile device, when a user requests detailed information related to the home appliance, the user may determine the detailed information without a separate tag.

In a home appliance and a method of controlling the same, as embodied and broadly described herein, a mobile device may receive model information from the home appliance, and may determine whether a diagnosis mode may be performed based on the model information, thus improving reliability of provided information.

In a home appliance and a method of controlling the same, as embodied and broadly described herein, by tagging a tag device of the home appliance and a mobile device, the home appliance and the mobile device may transmit and receive information and thus user convenience may be improved.

In a home appliance and a method of controlling the same, as embodied and broadly described herein, by displaying whether tagging is appropriately performed so that a user may recognize whether communication is presently being performed, reliability of communication may be improved.

A home appliance and a method of controlling the same are provided that diagnose a state of a washing machine using a mobile device.

A home appliance as embodied and broadly described herein may include a controller that processes state data, which is raw data representing an operation state of the home appliance and that outputs diagnosis result data representing whether an error occurs in the home appliance, and a tag unit including a tag storage unit that stores the state data and the diagnosis result data and a transmitting and receiving unit that transmits the state data and the diagnosis result data, when an external device is tagged.

A home appliance diagnosis system in accordance with an embodiment as broadly described herein may include a home appliance including a tag unit that stores state data, which is raw data that detects an operation state and diagnosis result data obtained from the state data and representing whether an error occurs in an operation state, and a mobile device including a communication device that tags with the tag unit and that receives the state data and the diagnosis result data and a display that displays data in which the communication device receives.

A method of controlling a home appliance as embodied and broadly described herein may include detecting an operation state of the home appliance; storing state data, which is detected raw data; obtaining diagnosis result data representing whether an error occurs in an operation state from the state data; detecting whether an external device is tagged; and transmitting, if an external device is tagged, the state data and the diagnosis result data.

A method of controlling a home appliance diagnosis system as embodied and broadly described herein may include executing a diagnosis mode; determining whether a communication device is activated in order to tag; receiving state data and diagnosis result data obtained from the state data and representing whether an error occurs in an operation state through tagging; and displaying the received state data or diagnosis result data.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A home appliance, comprising:
a controller configured to process state data including raw data corresponding to an operation state of the home appliance and to output diagnostic data indicating whether or not an error has occurred during operation of the home appliance; and
a tag device operably coupled to the controller and configured to exchange data with an external device through a tagging operation, the tag device including:
a tag storage device that receives and stores the state data and the diagnostic data; and a transmitting and receiving device that transmits the state data and the diagnostic data when near field communication is established with the external device, wherein the controller transmits data to the tag device with a cyclic redundancy check (CRC) code, and wherein the tag device receives the state data and the diagnosis result data from the controller and determines whether data is appropriately received based on the CRC code.

2. The home appliance of claim 1, wherein the tag storage device maintains storage of the state data and the diagnostic data even when a power supply thereto is interrupted.

3. The home appliance of claim 1, further comprising a detection device that detects a state of the home appliance, wherein the controller updates the state data and the diagnostic data stored in the tag storage device when the detection device detects that at least one predetermined event has occurred, wherein the at least one event includes at least one of when the detection device newly detects the operation state of the home appliance, when the detection device detects that an error has occurred during operation of the home appliance, when the detection device detects that a supply of power to the home appliance has been interrupted, or when a plug of the home appliance is unplugged.

4. A home appliance diagnostic system, comprising:

a home appliance, comprising a tag device that stores state data including raw data indicating an operation state of the home appliance and diagnostic data obtained from the state data and indicating whether or not an error has occurred in operation of the home appliance; and a mobile device, comprising:

a communication device that establishes near field communication with the tag device of the home appliance, and that receives the state data and the diagnostic data from the tag device; and a display that displays data received by the communication device, wherein the home appliance transmits data to the tag device with a cyclic redundancy check (CRC) code, and wherein the tag device receives the state data and the diagnosis result data from the home appliance and determines whether data is appropriately received based on the CRC code.

5. The home appliance diagnostic system of claim 4, further comprising a controller that updates the state data and the diagnostic data stored in the tag device when at least one predetermined event occurs.

6. The home appliance diagnostic system of claim 4, wherein the mobile device further includes:

an input device configured to receive an external input; and a controller that determines whether the diagnostic data includes information requested by the external input received by the input device.

7. The home appliance diagnostic system of claim 6, wherein the controller is configured to control the display to display the state data when information requested by the external input is not one of a plurality of diagnostic result values included in the diagnostic data.

8. The home appliance diagnostic system of claim 4, wherein the mobile device further includes a speaker that outputs a sound signal to indicate that near field communication is established between the communication device and the tag device.

9. The home appliance diagnostic system of claim 8, wherein the speaker outputs at least one of the state data or the diagnostic data with a corresponding sound signal.

10. The home appliance diagnostic system of claim 4, wherein the display of the mobile device is configured to display an indicator to indicate that the tag device and the communication device are communicating.

11. The home appliance diagnostic system of claim 4, wherein the mobile device further includes a controller that determines whether the diagnostic data includes information requested by a user, wherein the tag device stores model information of the home appliance, and the communication device receives the model information from the tag device, and wherein the controller determines whether a diagnosis mode can be performed based on the model information.

12. The home appliance diagnostic system of claim 4, wherein the model information includes at least one of a production company or a model name of the home appliance, and information indicating whether or not the home appliance is capable of external communication.

13. The home appliance diagnostic system of claim 4, wherein the display of the mobile device displays at least one of the state data or the diagnostic data related to a state of the home appliance at a plurality of points in time corresponding to a plurality of events that have occurred in operation of the home appliance.

14. A method of controlling a home appliance, the method comprising:

detecting an operation state of the home appliance;

storing state data including raw data detected while detecting the operation state of the home appliance;

obtaining diagnostic data from the state data indicating whether or not an error has occurred during operation of the home appliance;

transmitting the state data and the diagnostic data to a tag device with a cyclic redundancy check (CRC) code;

determining whether the state data and the diagnostic data are appropriately received based on the CRC code by the tag device;

detecting whether or not an external device has been tagged and has established near field communication with the home appliance; and when it is detected that an external device has been tagged, transmitting the state data and the diagnostic data to the tagged external device.

15. The method of claim 14, wherein storing state data and obtaining diagnostic data further includes storing the state data and the diagnostic data in a tag storage device of a tag device of the home appliance.

16. The method of claim 15, further comprising determining that at least one predetermined event has occurred, and wherein storing the state data and the diagnostic data further includes updating the state data and the diagnostic data when it is determined that the at least one predetermined event has occurred.

17. A method of controlling a home appliance diagnostic system, the method comprising:

executing a diagnostic mode of a home appliance;

determining whether or not a communication device has been activated and initiating a tagging operation to establish near field communication between the communication device and the home appliance if it is determined that the communication device has been activated;

transmitting the state data and the diagnostic data to the communication device with a cyclic redundancy check (CRC) code;

receiving state data and diagnostic data obtained from the state data, the diagnostic data indicating whether or not an error has occurred during operation of the home appliance, through the near field communication between the communication device and the home appliance established by the tagging operation; and displaying the received state data or diagnostic data, wherein receiving the state data and diagnostic data includes determining whether the state data and the diagnostic data are appropriately received based on the CRC code.

18. The method of claim 17, further comprising:
receiving an external request for information; and
determining whether or not the diagnostic data includes the information requested in the external request.

19. The method of claim 18, further comprising displaying the state data when it is determined that the diagnostic data does not include the information requested in the external request.

20. The method of claim 17, wherein receiving state data and diagnostic data includes displaying an indicator on a display or outputting a sound signal through a speaker indicating that near field communication has been established between the communication device and the home appliance and the tagging operation is being performed while receiving the state data and the diagnostic data.

* * * * *